US010899346B2

(12) United States Patent
Yoo et al.

(10) Patent No.: US 10,899,346 B2
(45) Date of Patent: Jan. 26, 2021

(54) VEHICLE AND CONTROL METHOD THEREOF

(71) Applicants: Hyundai Motor Company, Seoul (KR); Kia Motors Corporation, Seoul (KR)

(72) Inventors: Jeong-Jae Yoo, Incheon (KR); JuYun Ro, Seoul (KR); Hyung Jun Lim, Gyeonggi-do (KR); Dae Seok Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 285 days.

(21) Appl. No.: 16/002,182

(22) Filed: Jun. 7, 2018

(65) Prior Publication Data
US 2019/0256090 A1    Aug. 22, 2019

(30) Foreign Application Priority Data
Feb. 20, 2018   (KR) .......................... 10-2018-0019612

(51) Int. Cl.
*B60W 30/095* (2012.01)
*B60W 30/09* (2012.01)
*B60W 30/18* (2012.01)

(52) U.S. Cl.
CPC .......... *B60W 30/095* (2013.01); *B60W 30/09* (2013.01); *B60W 30/18163* (2013.01);
(Continued)

(58) Field of Classification Search
CPC ............... B60W 30/095; B60W 30/09; B60W 30/18163; B60W 2554/4041; B60W 2554/803; B60W 2520/52
See application file for complete search history.

(56) References Cited

U.S. PATENT DOCUMENTS 8,229,645 B2 * 7/2012 Lee .................... B62D 15/0285
                                                340/937
8,788,150 B2 * 7/2014 Hwang ............... B60L 15/2036
                                                701/41
(Continued)

FOREIGN PATENT DOCUMENTS

JP      2016110202 A     6/2016
JP      2017102835 A     6/2017
(Continued)

*Primary Examiner* — Angelina Shudy
(74) *Attorney, Agent, or Firm* — Mintz Levin Cohn Ferris Glovsky and Popeo, P.C.; Peter F. Corless

(57) ABSTRACT

A vehicle for estimating a moving path of an object approaching from behind, and determining a probability for entering a rear lane and a probability of collision is provided. The vehicle includes a speed sensor that detects speed information, a direction sensor that detects driving direction information, and a radar that senses an object approaching the vehicle. A controller then estimates a moving path of an object traveling on a rear lane and approaching the vehicle from behind and determines whether the vehicle is able to enter the rear lane, based on the speed information acquired by the speed sensor, the driving direction information acquired by the direction sensor, and data of the object sensed by the radar. Accordingly, the controller detects a probability of collision with the object approaching the vehicle on the rear lane.

16 Claims, 14 Drawing Sheets

(52) U.S. Cl.
CPC . *B60W 2420/52* (2013.01); *B60W 2554/4041* (2020.02); *B60W 2554/803* (2020.02)

(56) References Cited

U.S. PATENT DOCUMENTS

| | | | | |
|---|---|---|---|---|
| 9,738,315 | B2* | 8/2017 | Yoon | B60R 1/00 |
| 10,000,208 | B2* | 6/2018 | Suzuki | G05D 1/0214 |
| 10,101,168 | B2* | 10/2018 | Akiyama | B60W 30/09 |
| 10,377,329 | B2* | 8/2019 | Nam | B60R 21/00 |
| 10,449,955 | B2* | 10/2019 | Kim | B60W 40/10 |
| 2003/0156045 | A1* | 8/2003 | Tanaka | B62D 15/0285 340/932.2 |
| 2009/0157260 | A1* | 6/2009 | Lee | B62D 15/0285 701/41 |
| 2012/0068859 | A1* | 3/2012 | Mochizuki | G08G 1/166 340/903 |
| 2013/0226445 | A1* | 8/2013 | Nagata | B60W 30/12 701/300 |
| 2014/0244114 | A1* | 8/2014 | Matsubara | G08G 1/165 701/41 |
| 2014/0244142 | A1* | 8/2014 | Matsubara | B60W 10/20 701/116 |
| 2014/0288816 | A1* | 9/2014 | Hayasaka | B60W 10/18 701/301 |
| 2016/0231130 | A1* | 8/2016 | Akiyama | B60W 30/09 |
| 2017/0113665 | A1* | 4/2017 | Mudalige | G08G 1/166 |
| 2018/0144635 | A1* | 5/2018 | Jeon | G08G 1/162 |
| 2018/0345955 | A1* | 12/2018 | Kim | B62D 15/028 |
| 2019/0061764 | A1* | 2/2019 | Tokuhiro | G06K 9/00805 |
| 2019/0118801 | A1* | 4/2019 | Noh | G06K 9/00805 |
| 2020/0079357 | A1* | 3/2020 | Kline | G08G 1/14 |

FOREIGN PATENT DOCUMENTS

| | | |
|---|---|---|
| KR | 20090014550 A | 2/2009 |
| KR | 20170034960 A | 3/2017 |
| KR | 20170055724 A | 5/2017 |
| KR | 20170099587 A | 9/2017 |
| KR | 101781025 B1 | 10/2017 |

* cited by examiner

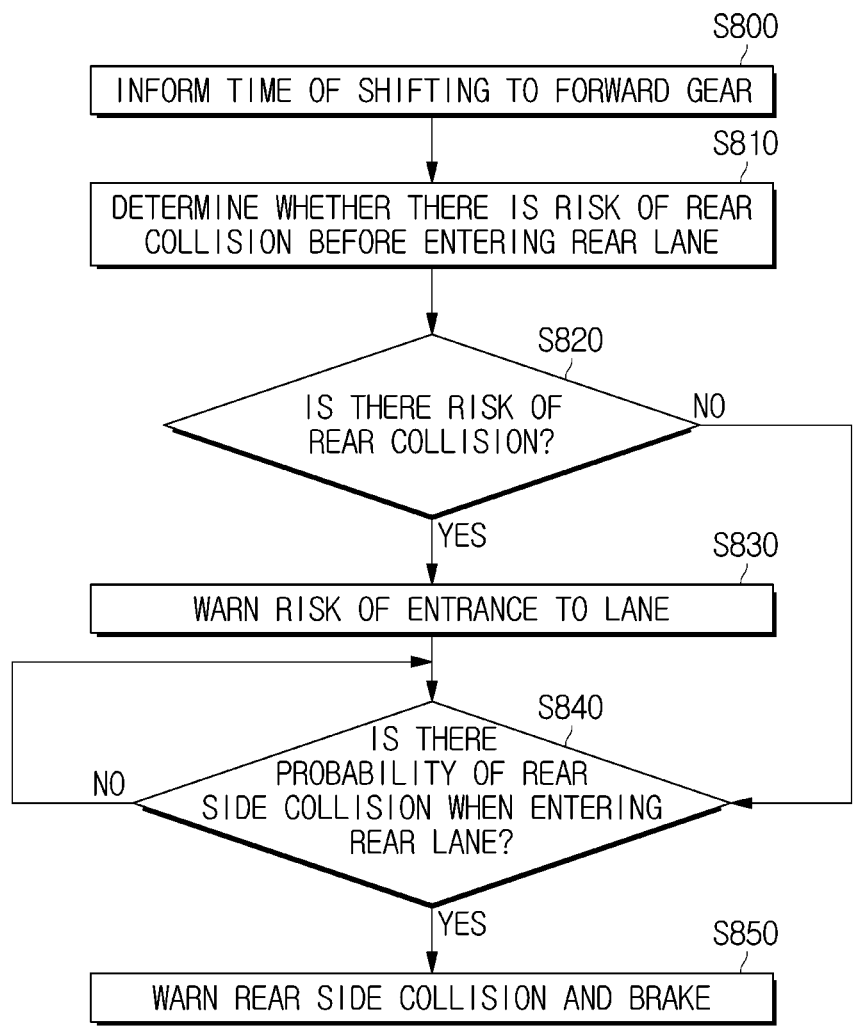

WARN RISK OF ENTRANCE IF T2<T1<T3

WARN RISK OF ENTRANCE IF T5<T4<T6

WARN RISK OF ENTRANCE IF T8<T7

WARN RISK OF REAR SIDE COLLISION AND CONTROL BRAKES IF T10<T9<T11

VEHICLE AND CONTROL METHOD THEREOF

CROSS-REFERENCE TO RELATED APPLICATION

This application is based on and claims priority under 35 U.S.C. § 119 to Korean Patent Application No. 10-2018-0019612, filed on Feb. 20, 2018, the disclosure of which is incorporated by reference herein in its entirety.

BACKGROUND

1. Field of the Disclosure

The present disclosure relates to a method of estimating a moving path of an object approaching from behind a traveling vehicle, and determining a probability for entering a rear lane and a probability of collision.

2. Description of the Related Art

A developed vehicle safety technology includes a collision avoidance assistance system that is capable of recognizing an object that approaches a vehicle using a radar, a camera, etc., determining a risk of collision with the object, and informing a driver of the vehicle of the risk of collision or braking the vehicle. A typical rear-end collision avoidance system recognizes, when a vehicle reverses, another vehicle approaching the vehicle within a blind spot to determine a risk of collision. As shown in FIG. 3, the technology of the prior art would be unable to recognize a dangerous situation when an object approaches the vehicle from a location which is not within the blind spot. For example, when another vehicle approaches the vehicle in a direction that is parallel to a moving direction of the vehicle while the vehicle reverses, the technology of the prior art is unable to recognize the other vehicle as a vehicle having a risk of collision.

However, when the vehicle reverses although the other vehicle comes into a driver's view, the driver has difficulties in accurately determining a risk of collision with the other vehicle approaching from behind. Accordingly, a technology for determining, when a vehicle reverses, a risk of collision with another vehicle approaching from behind regardless of a blind spot to control the vehicle is needed.

SUMMARY

Therefore, an aspect of the present disclosure provides a vehicle capable of determining, when reversing, a risk of collision with another vehicle approaching from behind regardless of a blind spot, and a method of controlling the vehicle. It is another aspect of the present disclosure to provide a vehicle capable of selecting, when entering a rear lane, one of a method of reversing and a method of moving forward and turning, and determining a risk of collision with another vehicle approaching from behind according to the selected method, and a method of controlling the vehicle. Additional aspects of the disclosure will be set forth in part in the description which follows and, in part, will be obvious from the description, or may be learned by practice of the disclosure.

In accordance with an aspect of the present disclosure, a vehicle may include a speed sensor configured to acquire speed information; a direction sensor configured to acquire driving direction information; a radar configured to sense an object approaching the vehicle; and a controller configured to estimate a moving path of an object traveling on a rear lane and approaching the vehicle from behind the vehicle and determine whether the vehicle is able to enter the rear lane, based on the speed information acquired by the speed sensor, the driving direction information acquired by the direction sensor, and data of the object sensed by the radar, and to determine a probability of collision with the object approaching the vehicle on the rear lane.

In particular, the controller may be configured to determine whether the vehicle needs to reverse to enter the rear lane or to move forward and turn to enter the rear lane. The controller may be configured to generate the rear lane virtually based on the moving path of the object. When the controller determines that the vehicle needs to move forward and turn to enter the rear lane, the controller may be configured to calculate a time at which the vehicle is able to enter the rear lane with a minimum turning radius.

When the controller determines that the vehicle needs to reverse to enter the rear lane, the controller may be configured to estimate a first time T1 taken for a rear end of the vehicle to reach the rear lane, a second time T2 taken for a front end of the object to reach a location at which the rear end of the vehicle reaches the rear lane, and a third time T3 taken for a rear end of the object to reach the location at which the rear end of the vehicle reaches the rear lane. When the controller determines that the first time T1 is greater than the second time T2 and less than the third time T3, the controller may be configured to detect a probability of collision.

Further, the controller may be configured to estimate a fourth time T4 taken for the vehicle to move forward from a current location and turn to completely enter the rear lane, a fifth time T5 taken for a front end of the object to reach a rear end of the vehicle when the vehicle has completely entered the rear lane, and a sixth time T6 taken for a rear end of the object to reach a front end of the vehicle when the vehicle has completely entered the rear lane. When the controller determines that the fourth time T4 is greater than the fifth time T5 and less than the sixth time T6, the controller may be configured to detect a probability of rear collision.

The controller may be configured to estimate a seventh time T7 and a moving distance D1 taken for a speed of the vehicle to reach a speed of the object after the vehicle completely enters the rear lane, and estimate an eighth time T8 taken for the front end of the object to reach the rear end of the vehicle when the speed of the vehicle reaches the speed of the object. When the controller determines that the seventh time T7 is greater than the eighth time T8, the controller may be configured to detect a probability of rear collision.

The controller may be configured to estimate a ninth time T9 taken for the vehicle to reach a location at which the front end of the vehicle reaches the rear lane, a tenth time T10 taken for the front end of the object to reach the location at which the front end of the vehicle reaches the rear lane, and an eleventh time T11 taken for the rear end of the object to reach the location at which the front end of the vehicle reaches the rear lane. When the controller determines that the ninth time T9 is greater than the tenth time T10 and less than the eleventh time T11, the controller may be configured to detect a probability of rear side collision.

In accordance with an aspect of the present disclosure, a vehicle may further include a driving apparatus configured to operate the vehicle according to a control of the controller. In addition, a vehicle may further include a communication device configured to transmit and receive data to and from another vehicle. When the object is determined to be another vehicle, the controller may be configured to determine whether the vehicle is able to enter the rear lane, based on data of the other vehicle received via the communication device, and detect a probability of collision.

In accordance with an aspect of the present disclosure, a method of controlling a vehicle may include acquiring speed information and driving direction information; sensing an object traveling on a rear lane and approaching the vehicle to acquire object data; estimating a moving path of the object based on the object data; determining whether the object is able to enter the rear lane, based on the speed information, the driving direction information, and the object data; and determining a probability of collision with the object traveling on the rear land and approaching the vehicle.

The determining of whether the vehicle is able to enter the rear lane may further include determining whether the vehicle needs to reverse to enter the rear lane or to move forward and turn to enter the rear lane. The estimating of the moving path of the object may include generating the rear lane virtually based on the moving path of the object. In addition, in response to determining that the vehicle needs to move forward and turn to enter the rear lane, the method may include calculating a time at which the vehicle is able to enter the rear lane with a minimum turning radius.

Further, in response to determining that the vehicle needs to reverse to enter the rear lane, the method may include estimating a first time T1 taken for a rear end of the vehicle to reach the rear lane, a second time T2 taken for a front end of the object to reach a location at which the rear end of the vehicle reaches the rear lane, and a third time T3 taken for the rear end of the object to reach the location at which the rear end of the vehicle reaches the rear lane; and detecting a probability of collision, when the first time T1 is greater than the second time T2 and less than the third time T3.

The determining of the probability of collision may further include estimating a fourth time T4 taken for the vehicle to move forward from a current location and turn to completely enter the rear lane, a fifth time T5 taken for a front end of the object to reach a rear end of the vehicle when the vehicle has completely entered the rear lane, and a sixth time T6 taken for a rear end of the object to reach a front end of the vehicle when the vehicle has completely entered the rear lane; and detecting a probability of rear collision, when the fourth time T4 is greater than the fifth time T5 and less than the sixth time T6.

The determining of the probability of collision may further include estimating a seventh time T7 and a moving distance D1 taken for a speed of the vehicle to reach a speed of the object after the vehicle completely enters the rear lane, and estimating an eighth time T8 taken for the front end of the object to reach the rear end of the vehicle when the speed of the vehicle reaches the speed of the object; and detecting a probability of rear collision, in response to determining that the seventh time T7 is greater than the eighth time T8.

Additionally, the determining of the probability of collision may include estimating a ninth time T9 taken for the vehicle to reach a location at which the front end of the vehicle reaches the rear lane, a tenth time T10 taken for the front end of the object to reach the location at which the front end of the vehicle reaches the rear lane, and an eleventh time T11 taken for the rear end of the object to reach the location at which the front end of the vehicle reaches the rear lane; and detecting a probability of rear side collision, in response to determining that the ninth time T9 is greater than the tenth time T10 and less than the eleventh time T11.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 and FIG. 7 are flowcharts illustrating a vehicle control method according to an exemplary embodiment of the present disclosure.

DETAILED DESCRIPTION

Figure 1:
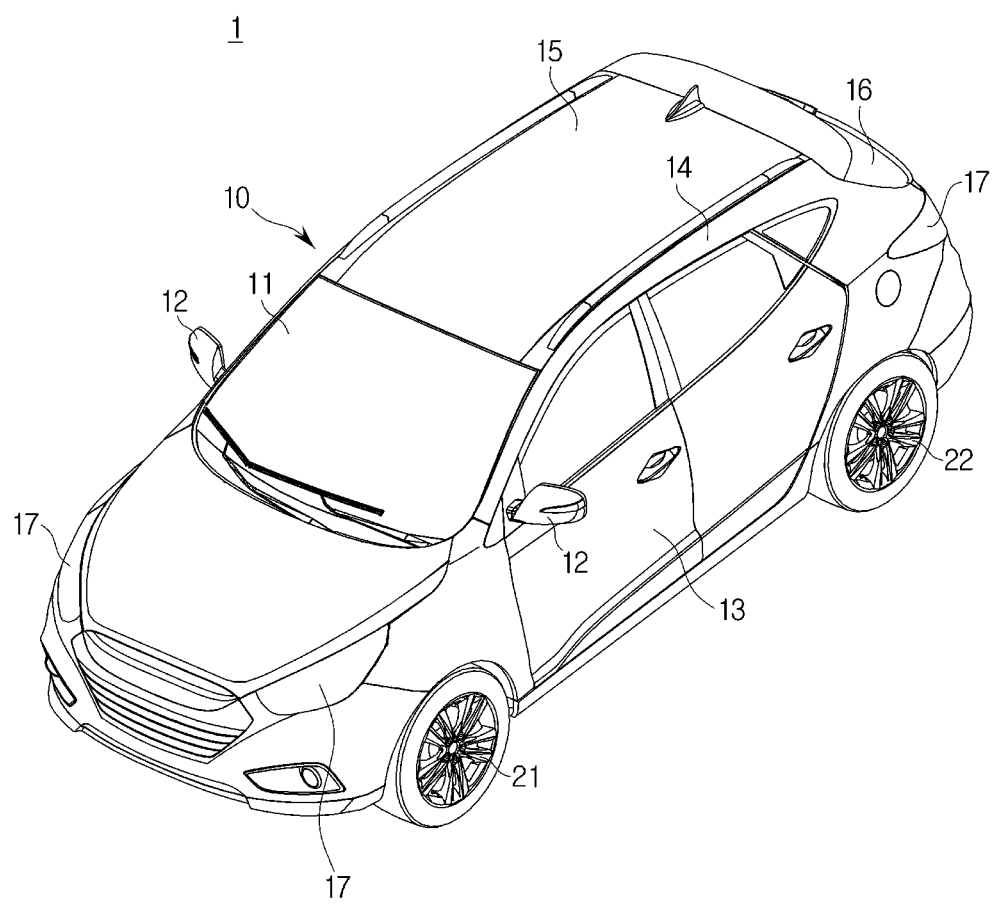
FIG. 1 shows the outer appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout this specification. This specification does not describe all components of exemplary embodiments, and general information in the technical field to which the present disclosure belongs or overlapping information between the embodiments will not be described. The terms "portion", "module", "member", and "block", as used herein, may be implemented as software or hardware, and according to embodiments, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network. It will be understood that, although the terms first, second, etc. may be used herein to describe various components, these components should not be limited by these terms. These terms are only used to distinguish one component from another. Reference numerals used in operations are provided for convenience of description, without describing the order of the operations, and the operations can be executed in a different order from the stated order unless a specific order is definitely specified in the context.

Figure 2:
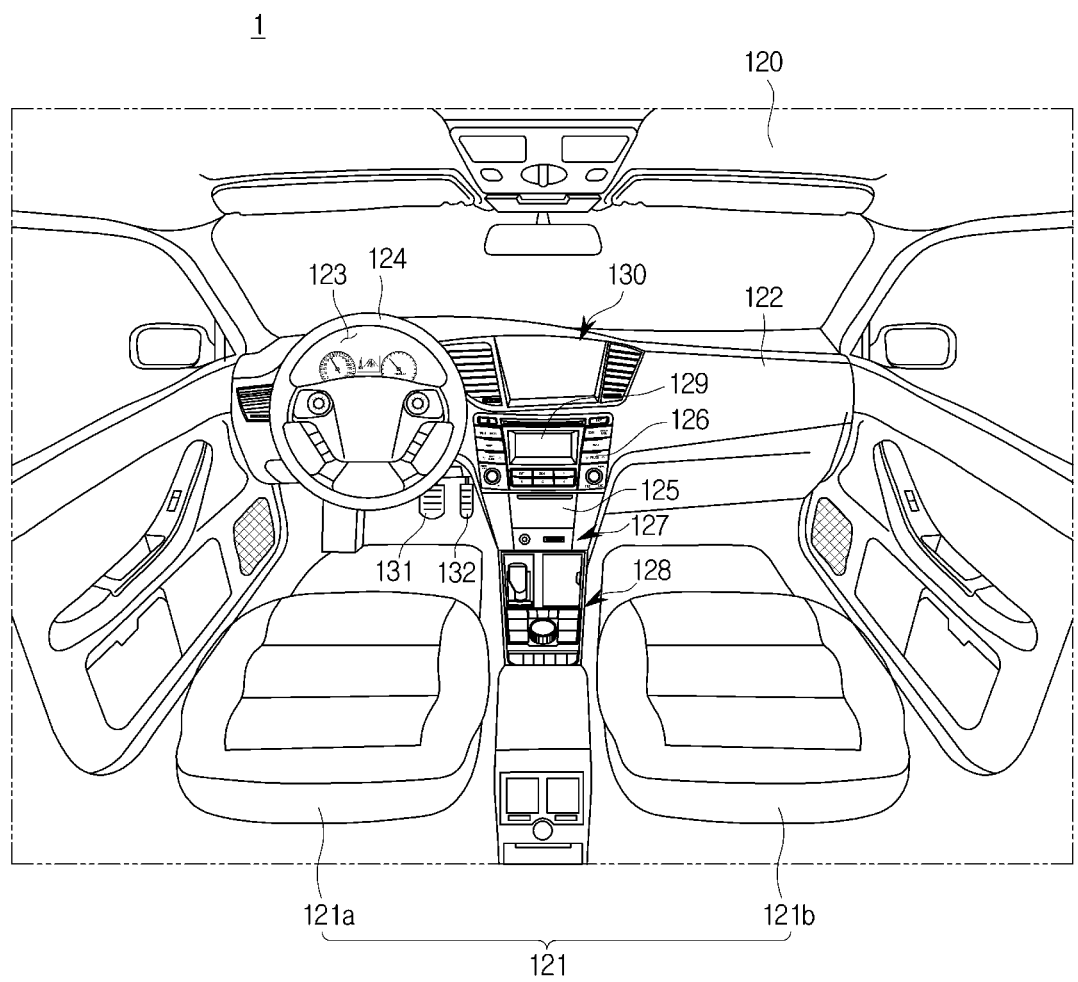
FIG. 2 shows the inside of a vehicle according to an exemplary embodiment.
Figure 3:
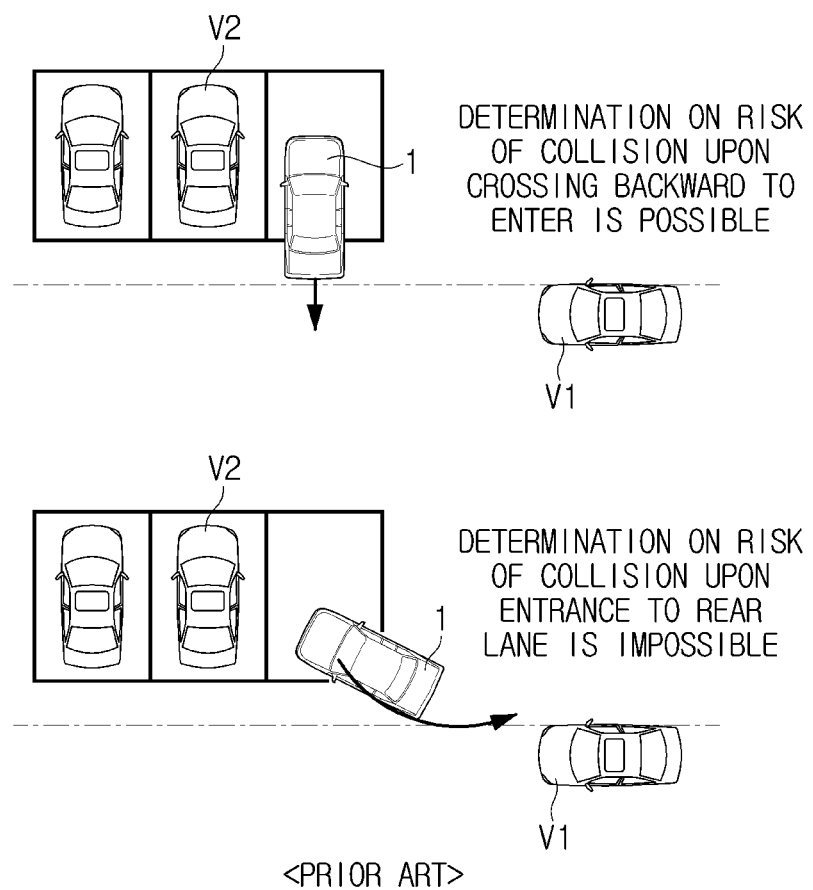
FIG. 3 shows a method of controlling a vehicle according to the prior art.

Hereinafter, an operation principle and embodiments of the present disclosure will be described in detail with reference to the accompanying drawings. FIG. 1 shows the outer appearance of a vehicle according to an exemplary embodiment, and FIG. 2 shows the inside of a vehicle according to an exemplary embodiment.

Referring to FIG. 1, a vehicle 1 may include a main body 10 that forms the outer appearance of the vehicle 1, a windscreen 11 configured to provide a driver with a front view of the vehicle 1, a plurality of side-view mirrors 12 configured to provide the driver with side and rear views of the vehicle 1, a plurality of doors 13 configured to shield the inside of the vehicle 1 from the outside, a roof panel 15, a plurality of fillers 14 configured to support the roof panel 15, a rear window glass 16, a plurality of turn signals 17, a plurality of front wheels 21 disposed in a front portion of the vehicle 1, and a plurality of rear wheels 22 disposed in a rear portion of the vehicle 1, wherein the front wheels 21 and the rear wheels 33 are collectively referred to as wheels.

The windscreen 11 may be disposed in the front upper portion of the main body 10 to enable the driver inside the vehicle 1 to acquire visual information of a front view of the vehicle 1. Additionally, the side-view mirrors 12 may include a left side-view mirror disposed to the left of the main body 10 and a right side-view mirror disposed to the right of the main body 10 to allow the driver inside the vehicle 1 to acquire visual information regarding side and rear views of the vehicle 1. The doors 13 may be rotatably disposed to the left and right of the main body 10 to allow the driver to open intone of the doors to enter the vehicle 1. The doors 13 may shield the interior of the vehicle 1 from the outside when all of the doors are closed.

A chassis of the vehicle 1 may include a power generation system, a power transfer system, a driving system, a steering system, a brake system, an acceleration system, a suspension system, a transmission system, a fuel system, and front, rear, left, and right wheels. The vehicle 1 may include various safety systems for a driver and passengers' safety.

As an example of the brake system, a brake pedal 131 may be installed within the vehicle 1, and as an example of the acceleration system, an accelerator pedal 132 may be installed within the vehicle 1.

Particularly, the safety systems of the vehicle 1 may include an airbag system to secure a driver and passengers' safety upon collision, and an electronic stability control (ESC) system to avoid loss of control of the vehicle 1 when the vehicle 1 accelerates or turns rapidly. The vehicle 1 may include an electronic control unit (ECU) configured to operate the power generation system, the power transfer system, the driving system, the steering system, the brake system, the suspension system, the transmission system, the fuel system, the various safety systems, and the sensors.

Additionally, the vehicle 1 may include various types of sensors 200. For example, the vehicle 1 may include a proximity sensor configured to sense an obstacle or another vehicle in the front, rear, or side of the vehicle 1 (e.g., the subject vehicle, the traveling vehicle, the first vehicle, etc.), a rain sensor configured to detect rain and an amount of rainfall, a speed sensor 210 configured to detect speed of the wheels 21 and 22 of the vehicle 1, a lateral acceleration sensor configured to detect lateral acceleration of the vehicle 1, a yaw rate sensor configured to detect a change in angular speed of the vehicle 1, a gyro sensor, and a direction sensor 220 configured to detect a rotation of a steering wheel and a driving direction of the vehicle 1.

The sensors 200 may further include a sensor configured to measure a distance to an object at predetermined time intervals, such as a laser sensor, an infrared sensor, a radar 230, and a LiDAR sensor. The LiDAR sensor may be configured to radiate laser, and detect laser reflected from a target object to sense a distance to the target object, a direction to the target object, speed of the target object, temperature of the target object, a material distribution of the target object, a concentration property of the target object, etc. The LiDAR sensor may further be configured to scan the target object by sampling the surface of the target object, and output sampled point data.

Additionally, the vehicle 1 may include an imaging device 240 (e.g., a camera, video camera, etc.) for photographing surroundings of the vehicle 1 to collect image data regarding the surroundings of the vehicle 1. The radar 230 or the camera 240 may be installed in a front radiator grill or a front head lamp of the vehicle 1. The radar 230 or the camera 240 may be integrated into a heating wire in a rear portion of the roof panel 15, that is, an upper portion of the rear window glass 16. In other words, the radar 230 or the camera 240 may be installed at an arbitrary location.

Referring to FIG. 2, the interior 120 of the main body 10 may include a plurality of seats 121 (121a and 121b) configured to accommodate a passenger, a dashboard 122, an instrument panel (that is, a cluster 123) disposed on the dashboard 122 and on which a tachometer, a speedometer, a coolant thermometer, a fuel gauge, a turn signal indicator light, a high beam indicator light, a warning light, a seat belt warning light, an odometer, a traveling recorder, an automatic transmission lever indicator light, a door open warning light, an engine oil warning light, a fuel warning light, etc. are mounted, a steering wheel 124 for enabling the driver to change a moving direction of the vehicle 1, and a center fascia 125 on which an audio system and a control panel of an air conditioner are mounted.

The seats 121 may include a driver seat 121*a*, a passenger seat 121*b*, and a back seat disposed in the back inside of the vehicle 1. The cluster 123 may be implemented in a digital fashion. In other words, the cluster 123 implemented in the digital fashion may be configured to display information regarding the vehicle 1 and driving information as images. The center fascia 125 may include a head unit 126 disposed in the dashboard 122 between the driver seat 121*a* and the passenger seat 121*b*, and configured to operate the audio system, the air conditioner, and seat heaters. The head unit 126 may include a plurality of buttons or other input interfaces to receive commands for operating the audio system, the air conditioner, and the seat heaters. In the center fascia 125, a vent, a cigar jack, a multi-terminal 127, etc. may be installed. The multi-terminal 127 may be disposed adjacent to the heat unit 126, and may further include a USB port, an AUX terminal, and a SD slot.

The vehicle 1 may further include an input device 128 configured to receive commands for performing various functions, and a display 129 configured to display information regarding a function being performed and information input by a user. The input device 128 may be mounted on at least one of the head unit 126 and the center fascia 125, and include at least one physical button, such as on/off buttons for executing or stopping various functions, buttons for changing setting values of the various functions, etc. The input device 128 may be configured to transmit operating signals of the buttons to the ECU or an audio video navigation (AVN) system 130.

Further, the input device 128 may include a touch panel integrated into a display of the AVN system 130. The input device 128 may be activated in the shape of buttons and displayed on the display of the AVN system 130, and in this case, the input device 128 may be configured to receive position information of the displayed buttons (e.g. position information of the user input). The input device 128 may further include a jog dial (not shown) or a touch pad for receiving a command for moving or selecting a cursor displayed on the display of the AVN system 130. The jog dial or the touch pad may be positioned on the center fascia, etc.

More specifically, the input device 128 may be configured to receive a user input of selecting one of an autonomous driving mode and a manual driving mode in which a driver is in control of the vehicle. When the input device 128 receives a user input selecting the autonomous driving mode, the input device 128 may be configured to transmit an input signal of the autonomous driving mode to a controller. The controller may then be configured to distribute signals to various components within the vehicle 1, and also transfer control signals for the components within the vehicle 1 to the individual components. The controller may be an ECU. The term "controller" is used to be interpreted in a broad sense, and it is not limited by the terminology.

Additionally, when a navigation function is selected, the input device 128 may be configured to receive information regarding a destination, and transmit the information to the AVN system 130. When a digital multimedia broadcasting (DMB) function is selected, the input device 128 may be configured to receive channel and volume information, and transmit the channel and volume information to the AVN system 130. The display panel of the display 128 may be a light emitting diode (LED) panel, an organic light emitting diode (OLED) panel, or a liquid crystal display (LCD) panel.

In the center fascia 126, the AVN system 130 may be provided to receive information from the user, and output results that correspond to the received information. The AVN system 130 may perform at least one function among the navigation function, the DMB function, an audio function, and a video function, and display driving information and environment information of a road in the autonomous driving mode. The AVN system 30 may be mounted on the dashboard 122. Additionally, the vehicle 1 may optionally include various electronic apparatuses, such as a hands-free system for improving a driver's convenience, a global positioning system (GPS), an audio system, a Bluetooth device, a rear camera, a charging apparatus for a terminal, and a High-pass apparatus.

The vehicle 1 may further include a start button configured to receive an input for an operation command to a start motor (not shown). In other words, when the start button is turned on or otherwise engaged, the vehicle 1 may operate the start motor (not shown), and drive an engine (not shown) which is a power generating apparatus. The vehicle 1 may further include a battery (not shown) electrically connected to the terminal, the audio system, the indoor lamp, the start motor, and the other electronic devices to supply driving power to them. The battery may perform charging using a generator thereof or power of the engine during driving.

Figure 4:
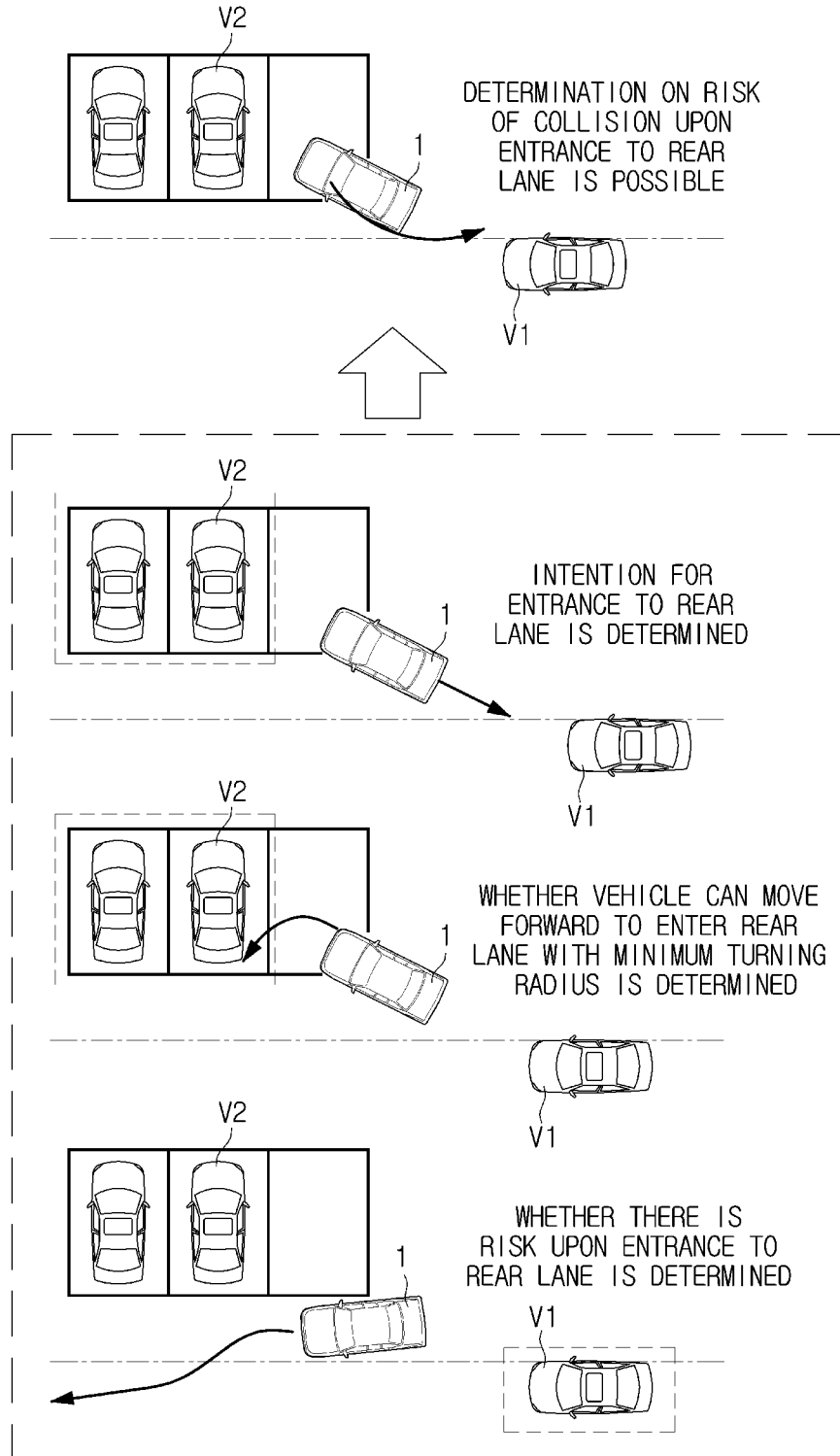
FIG. 4 is a view describing a difference between a vehicle according to an embodiment and a control method thereof and a typical technology.

FIG. 4 is a view illustrating a difference between a vehicle according to an embodiment and a control method thereof and a typical technology. Referring to FIG. 4, the vehicle 1 according to an exemplary embodiment may determine, when reversing, a probability or risk of collision with another vehicle V1 entering a driver's view (e.g., view of a driver within the subject vehicle), unlike a typical technology.

To determine a probability or risk of collision with another vehicle V1, the vehicle 1 (e.g., the subject vehicle or the traveling vehicle) may first be configured to determine whether entering a rear lane is possible, when reversing, and then, the vehicle 1 may be configured to determine reversing of the subject vehicle is necessary to enter the rear lane or to move forward and then turn with a minimum turning radius to enter the rear lane. Thereafter, the vehicle 1 may be configured to determine whether there is a probability or risk of collision with another vehicle V1 approaching the vehicle 1 from behind when the vehicle is entering the rear lane. Therefore, the vehicle 1 according to an embodiment may be configured to determine a probability of collision regardless of a blind spot, when another vehicle V1 approaches the vehicle 1 from behind.

Figure 5:
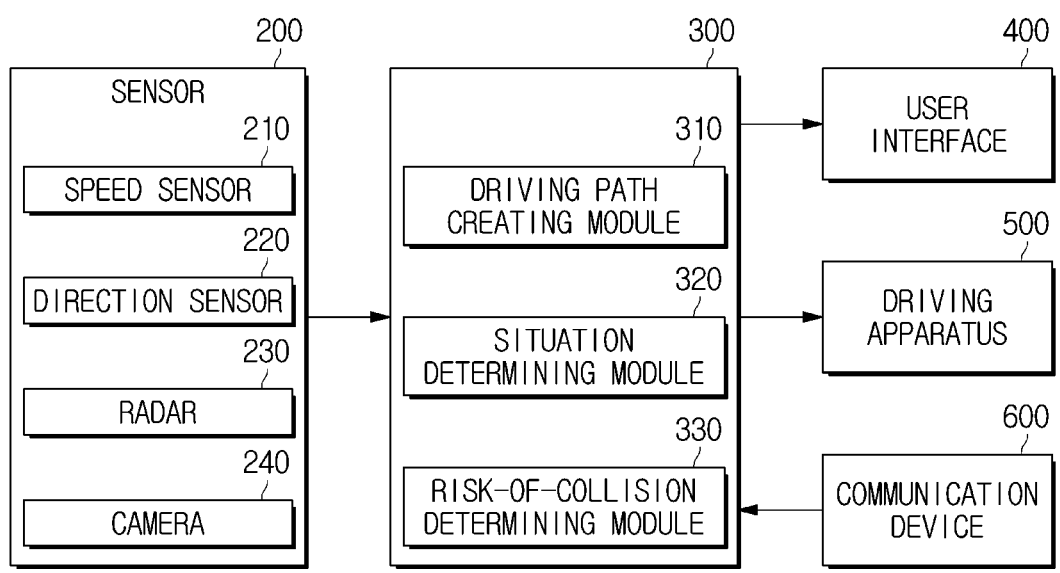
FIG. 5 is a control block diagram of a vehicle according to an exemplary embodiment of the present disclosure.

FIG. 5 is a control block diagram of a vehicle according to an exemplary embodiment. Referring to FIG. 5, the vehicle 1 may include a sensor 200, a controller 300, and a user interface 400. Additionally, the vehicle 1 may include a driving system 500 configured to operate the vehicle 1, and a communication device 600 configured to transmit and receive data to and from other vehicles.

The sensor 200 may include a plurality of sensors 200 mounted within the vehicle 1, as described above. In other words, the vehicle 1 may include the speed sensor 210 configured to detect speed information, the direction sensor 220 configured to detect driving direction information, and the radar 230 configured to detect an object approaching the vehicle 1, and the vehicle 1 may further include the camera 240 configured to capture surrounding images to acquire image data.

In particular, the radar 230 may be configured to sense a nearby object to generate object data. The radar 230 may be configured to radiate electromagnetic waves, and measure electromagnetic waves reflected from objects detected within a measurement range to thereby measure distances to the objects. Additionally, the radar 230 may be configured to measure spatial coordinates of an object, and collect three dimensional (3D) information of the object based on the spatial coordinates of the object. The radar 230 may also be configured to measure speed of a nearby object.

The camera 240 or imaging device may be configured to capture images of surroundings to generate image data. In particular, the camera 240 may be configured to capture images of surroundings to acquire an image of an object existing around the vehicle 1. In other words, the camera 240 may be configured to acquire an image of another vehicle located in front of, behind, or beside the vehicle 1 and an image of a surrounding environment. The camera 240 may also be configured to acquire an image of a road on which the vehicle 1 is being driven.

The controller 300 may be configured to estimate a moving path of an object approaching the vehicle 1 from behind the vehicle 1, based on speed information acquired by the speed sensor 210, driving direction information acquired by the direction sensor 220, and data of the object sensed by the radar 230, determine whether the vehicle 1 may enter a rear lane, and determine a probability of collision with the object approaching the vehicle 1 on the rear lane. The controller 300 may then be configured to determine whether the vehicle 1 intends to enter the rear lane based on the estimated moving path. Additionally, when the object is determined to be another vehicle, the controller 300 may be configured to determine whether the vehicle 1 may safely enter the rear lane, based on data of the other vehicle received via the communication device 600, and determine a probability of collision.

More specifically, the controller 300 may be configured to estimate a moving path of the vehicle 1 and a moving path of an object. The controller 300 may include a driving path creating module 310 configured to generate a rear lane virtually, a situation determining module 320 configured to determine whether the vehicle 1 is capable of entering the rear lane and determine whether the vehicle 1 is required to be driven in reverse to enter the rear lane or to move forward and turn to enter the rear lane, and a risk-of-collision determining module 330 configured to determine a probability of collision with an object approaching the vehicle 1 on the rear lane. The object may be another vehicle V1, a pedestrian, etc. The object data may include a type of the object, speed of the object, driving direction data of the object, etc.

Figure 8A:
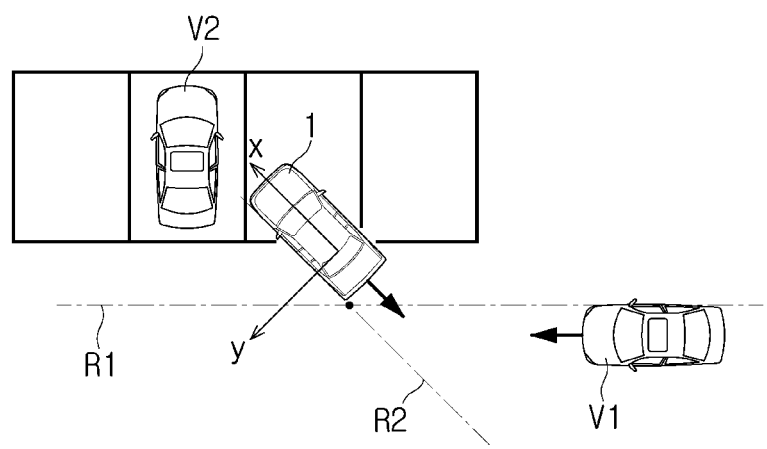
FIG. 8A to FIG. 12 are views illustrating a vehicle control method in detail according to an exemplary embodiment of the present disclosure.

Referring to FIG. 8A, the driving path creating module 310 may be configured to estimate a moving path R2 of the vehicle 1 and a moving path of another vehicle V1, based on speed information of the vehicle 1, driving direction information of the vehicle 1, and data of an object approaching the vehicle 1 from behind the vehicle 1. The driving path creating module 310 may be configured to generate a rear lane virtually, based on speed information and driving direction information of the other vehicle V1. The driving path creating module 310 may use a width of the other vehicle V1 as a width of a rear lane, and a straight line that extends from the side of the other vehicle V1 as a line R1 of the rear lane, thereby generating the rear lane.

Additionally, when the vehicle 1 is able to move forward and turn to enter the rear lane, the situation determining module 320 may be configured to calculate a time at which the vehicle 1 may enter the rear lane with a minimum turning radius. When the vehicle 1 enters the rear lane, it is relatively safer for the vehicle 1 to move forward and then turn to enter the rear lane, than to reverse to enter the rear lane since a driver is capable of more easily operating the vehicle 1 when driving the vehicle 1 forward. Accordingly, the situation determining module 320 may be configured to determine whether the vehicle 1 is capable of moving forward and turn to enter the rear lane, and calculate a time at which the vehicle 1 is capable of moving forward to enter the rear lane with a minimum turning radius when reversing, thereby assisting safe driving. The situation determining module 320 may be configured to calculate the time at which the vehicle 1 is capable of moving forward to enter the rear lane with the minimum turning radius when reversing, as a time of shifting to the forward gear.

Further, the risk-of-collision determining module 330 may be configured to determine a probability of collision with an object approaching the vehicle 1 on the rear lane, when the vehicle 1 reverses to enter the rear lane or when the vehicle 1 moves forward and turns to enter the rear lane. Hereinafter, a method in which the risk-of-collision determining module 330 determines a probability of collision will be described in detail with reference to FIGS. 10 to 12.

The user interface 400 may provide the driver with risk-of-collision information under the operation of the controller 300. In other words, the user interface 400 may stimulate at least one of the driver's senses of sight, touch, and hearing to provide the driver with risk-of-collision information. The user interface 400 may be the AVN system 130 installed within the vehicle 1. Additionally, the user interface 400 may inform the user of a time (or a time of shifting to the forward gear) at which the vehicle 1 is capable of entering the rear lane with a minimum turning radius calculated by the controller 300.

The driving apparatus 500 may be configured to operate the vehicle 1 according to the operation of the controller 300. For example, the driving apparatus 500 may be configured to receive a control signal of the controller 400 to operate the steering wheel 124, the brake pedal 131, the accelerator pedal 132, etc., thereby operating the vehicle 1. When detecting a movement of the vehicle 1 after receiving a warning informing a risk of collision, the controller 300 may be configured to operate the driving apparatus 500 to brake the vehicle 1.

Figure 6:
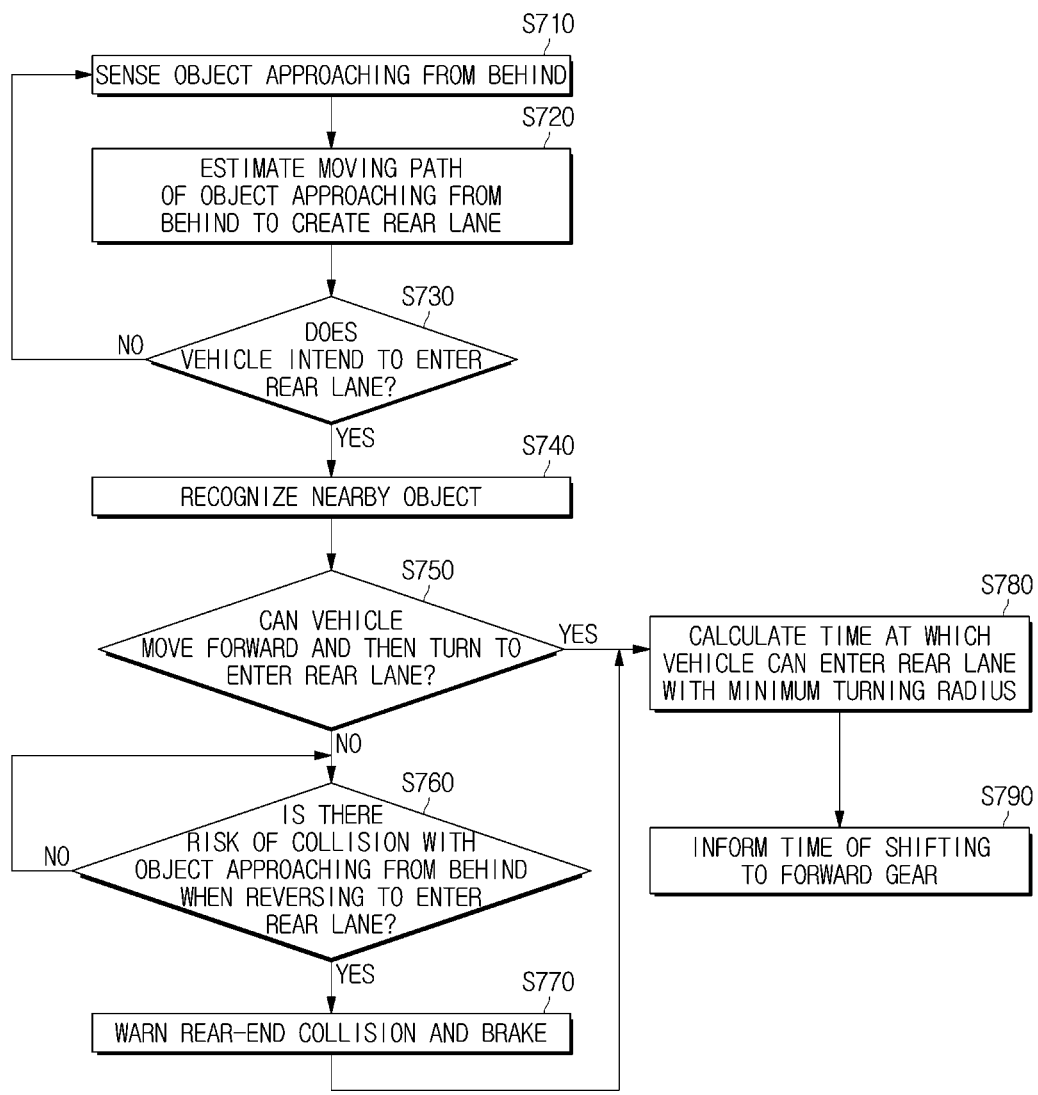

FIGS. 6 and 7 are flowcharts illustrating a vehicle control method according to an exemplary embodiment. As described above, the vehicle 1 may include the sensor 200, the controller 300, the user interface 400, and the driving apparatus 500.

Referring to FIG. 6, the sensor 200 may be configured to sense an object that approaches the subject vehicle 1 from behind, in operation S710, and the controller 300 may be configured to estimate a moving path of the object that approaches the subject vehicle 1 from behind \based on speed information and direction information of the object to generate a rear lane virtually, in operation S720. As shown in FIG. 8A, the rear lane generated virtually may include a virtual line R1. Additionally, the controller 300 may be configured to estimate a moving path R2 of the vehicle 1 based on speed information and driving direction information of the vehicle 1, and determine whether the vehicle 1 intends to enter the rear lane, based on the moving path R2 of the vehicle 1, in operation S730.

Figure 8B:
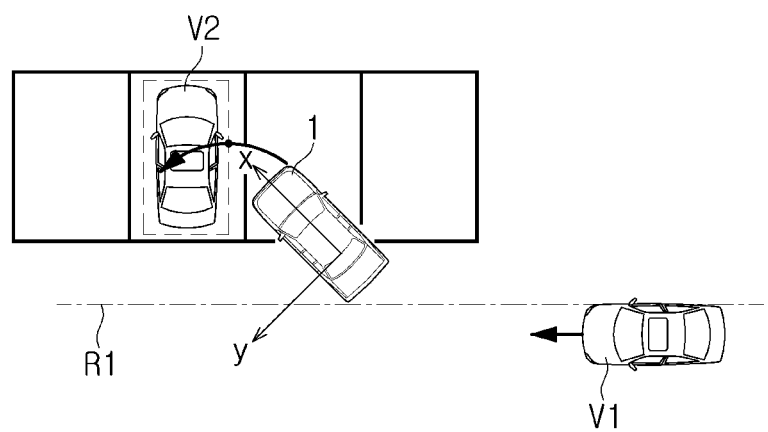
Figure 9:
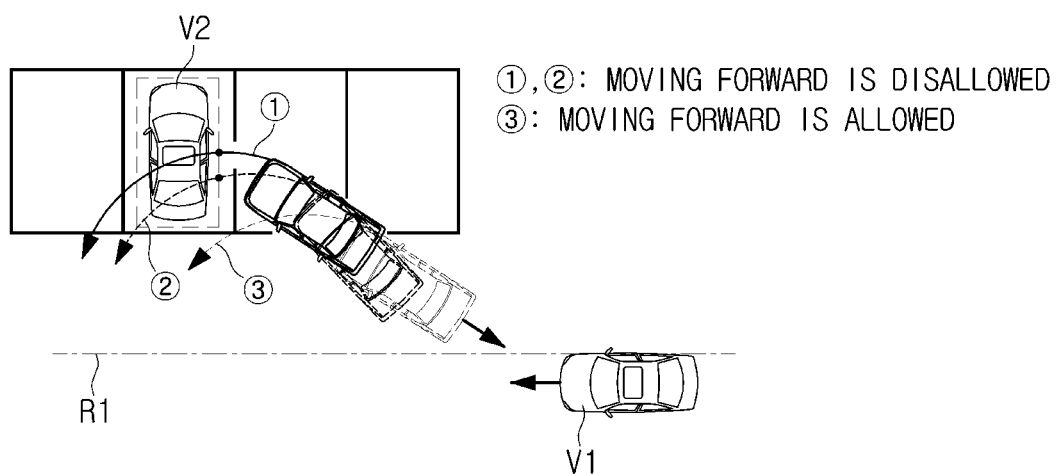

When the controller 300 determines that the vehicle 1 intends to enter the rear lane, the controller 300 may be configured to receive data of a nearby object from the sensor 200 to recognize and detect the nearby object, in operation S740. Particularly, as shown in FIG. 8B, the controller 300 may be configured to recognize an object V2 located in front of the vehicle 1, and determine whether the vehicle 1 is capable of moving forward and then turning to enter the rear lane, in operation S750. In other words, as shown in FIG. 9, the controller 300 may be configured to determine a probability or risk of collision with the object located in front of the vehicle 1 when the vehicle 1 moves forward and then turns.

When the controller 300 determines that the vehicle 1 is unable to move forward and then turn to enter the rear lane, the controller 300 may be configured to determine whether there is a risk of collision with an object approaching the vehicle 1 from behind the vehicle 1 when the vehicle 1 reverses to enter the rear lane, in operation S760. When the controller 300 determines a risk of collision with the object, the controller 300 may be configured to operate the user interface 400 to output a rear-end collision warning, and operate the driving apparatus 500 to brake the vehicle 1, in operation S770.

Figure 10:
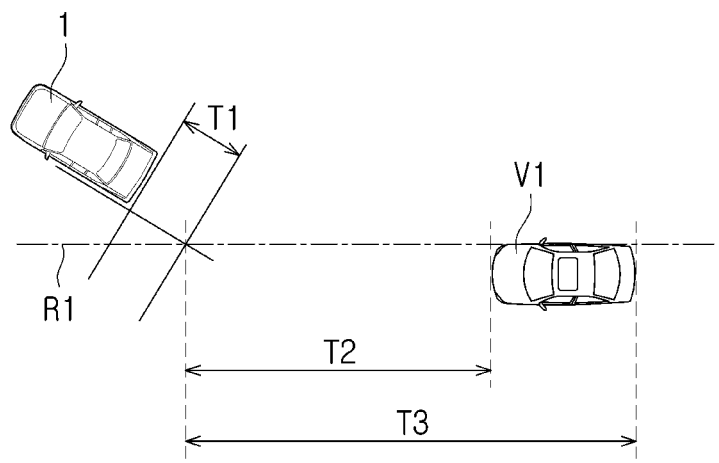

Referring to FIG. 10, the controller 300 may be configured to estimate a first time T1 taken for a rear end of the vehicle 1 to reach the line R1 of the rear lane, a second time T2 taken for a front end of an object V1 to reach a location at which the rear end of the vehicle 1 reaches the line R1 of the rear lane, and a third time T3 taken for the rear end of the object V1 to reach the location at which the rear end of the vehicle 1 reaches the rear lane. When the controller 300 determines that the first time T1 is greater than the second time T2 and less than the third time T3, the controller 300 may be configured to detect a probability of collision.

When the vehicle 1 is capable of moving forward and then turning to enter the rear lane, the controller 300 may be configured to calculate a time at which the vehicle 1 is capable of entering the rear lane with a minimum turning radius, in operation S780, and operate the user interface 400 inform the driver of the time at which the vehicle 1 may enter the rear lane with the minimum turning radius or a time of shifting to the forward gear, in operation S790. Referring to FIG. 9, when the vehicle 1 is located at a position ① or ② upon reversing, the controller 300 may be configured to determine that the vehicle 1 is unable to move forward and turn due to the front object V2, and when the vehicle 1 is located at a position ③, the controller 300 may be configured to determine that the vehicle 1 may enter the rear lane R1 with the minimum turning radius.

Referring to FIG. 7, when the vehicle 1 is capable of moving forward and turning to enter the rear lane, the backward gear may be shifted to the forward gear based on information regarding the time at which the vehicle 1 is capable of entering the rear lane with the minimum turning radius or information regarding the time of shifting to the forward gear, in operation S800. The gear shifting may be performed by the driver, and when the vehicle 1 is an autonomous driving vehicle, the controller 300 may be configured to execute the gear shifting.

Further, the controller 300 may be configured to determine whether there is a probability or risk of rear collision, before the vehicle 1 enters the rear lane, in operations S810 and S820. When the controller 300 detects a probability of rear collision, the controller 300 may be configured to operate the user interface 400 to warn a driver of a risk of entrance into the road lane, in operation S830.

Figure 11A:
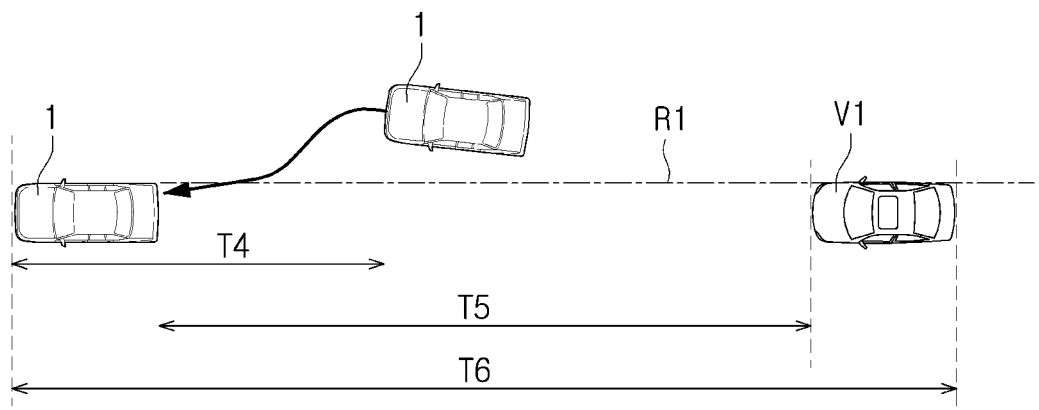

Referring to FIG. 11A, the controller 300 may be configured to estimate a fourth time T4 taken for the vehicle 1 to completely enter the rear lane, a fifth time T5 taken for the front end of the object V1 to reach the rear end of the vehicle 1 when the vehicle 1 has completely entered the rear lane, and a sixth time T6 taken for the rear end of the object V1 to reach the front end of the vehicle 1 when the vehicle 1 has completely entered the rear lane. When the controller 300 determines that the fourth time T4 is greater than the fifth time T5 and less than the sixth time T6, the controller 300 may be configured to determine that there is a probability or risk of rear collision.

Figure 11B:
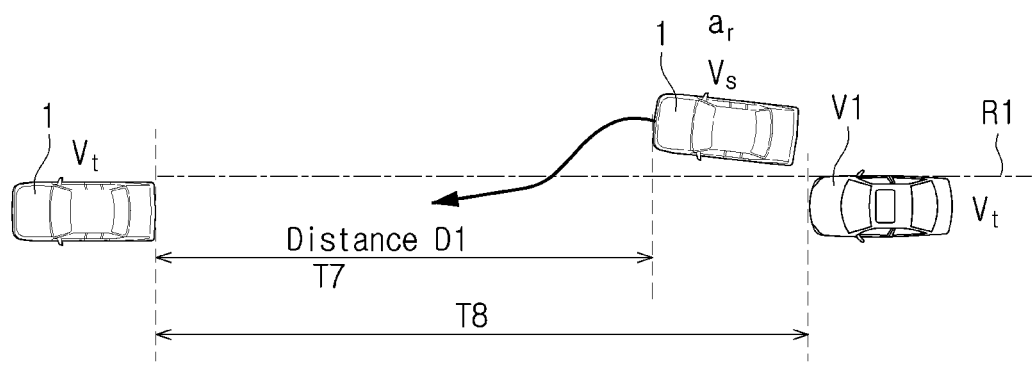

Additionally, referring to FIG. 11B, the controller 300 may be configured to estimate a seventh time T7 and a moving distance D1 taken for the speed of the vehicle 1 to reach the speed as the object V1 after the vehicle 1 completely enters the rear lane, and estimate an eighth time T8 taken for the front end of the object V1 to reach the rear end of the vehicle 1 when the speed of the vehicle 1 reaches that of the object V1. When the controller 300 determines that the seventh time T7 is greater than the eighth time T8, the controller 300 may be configured to determine that there is a probability or risk of rear collision. The controller 300 may be configured to determine whether there is a probability of rear side collision when the vehicle 1 starts entering the rear lane, in operation S840. When the controller 300 determines that there is a probability of rear side collision, the controller 300 may be configured to operate the user interface 400 to warn a rear side collision, and operate the driving apparatus 500 to brake the vehicle 1, in operation 5850.

Figure 12:
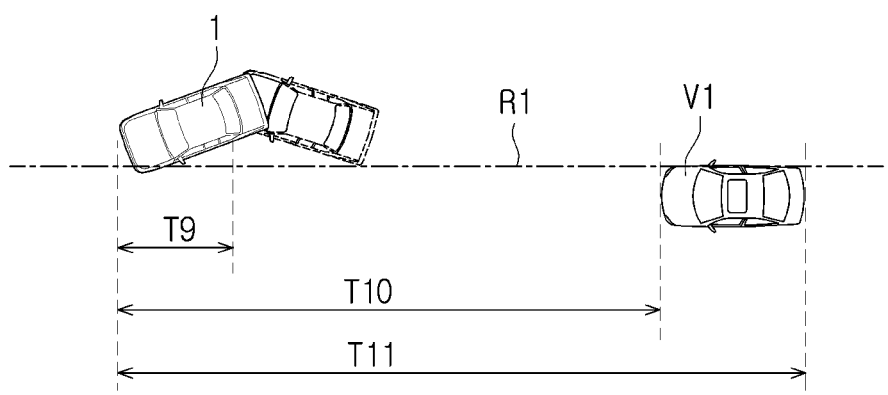

Referring to FIG. 12, the controller 300 may be configured to estimate a ninth time T9 taken for the vehicle 1 to reach a location at which the front end of the vehicle 1 reaches the rear lane R1, a tenth time T10 taken for the front end of the object V1 to reach the location at which the front end of the vehicle 1 reaches the rear lane R1, and an eleventh time T11 taken for the rear end of the object V1 to reach the location at which the front end of the vehicle 1 reaches the rear lane R1. When the controller 300 determines that the ninth time T9 is greater than the tenth time T10 and less than the eleventh time T11, the controller 300 may be configured to determine that there is a probability of rear side collision.

Moreover, the first time T1 to the eleventh time T11, which are factors considered for a determination of a collision risk, are represented numerically only to distinguish one from another, and the times are not in a dependent relationship. Accordingly, symbols representing times denoted in different drawings or claims should be understood independently.

According to the vehicle and the control method thereof, as described above, by determining, when reversing, a probability of collision with another vehicle approaching the vehicle from behind regardless of a blind spot to control the vehicle according to the result of the determination, it may be possible to decrease an accident rate. Additionally, according to the vehicle and the control method thereof, by selecting, when entering a rear lane, one of a method of reversing and a method of moving forward and turning, and determining a probability of collision with another vehicle approaching the vehicle from behind according to the selected method, a driver may operate the vehicle more safely even in narrow space.

Meanwhile, the above-described exemplary embodiments may be embodied in the form of recording medium to store commands executable by a computer. The commands may be stored in the form of program codes, and when executed by a processor, the commands can create a program module to perform operations of the exemplary embodiments. The recording medium may be embodied as computer-readable recording medium. The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

Although exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle, comprising:
   a speed sensor configured to detect speed information;
   a direction sensor configured to detect driving direction information;
   a radar configured to sense an object approaching the vehicle; and
   a controller configured to estimate a moving path of an object traveling on a rear lane and approaching the vehicle from behind and determine whether the vehicle is able to enter the rear lane, based on the speed information detected by the speed sensor, the driving direction information detected by the direction sensor, and data of the object sensed by the radar, and to determine a probability of collision with the object approaching the vehicle on the rear lane,
   wherein when the controller determines that the vehicle is required to operate in reverse to enter the rear lane, the controller is configured to estimate a first time taken for a rear end of the vehicle to reach the rear lane, a second time taken for a front end of the object to reach a location at which the rear end of the vehicle reaches the rear lane, and a third time taken for a rear end of the object to reach the location at which the rear end of the vehicle reaches the rear lane, and when the controller determines that the first time is greater than the second time and less than the third time, the controller is configured to detect a probability of collision.

2. The vehicle according to claim 1, wherein when the controller determines whether the vehicle is able to enter the rear lane, the controller is configured to determine whether the vehicle is required operate in reverse to enter the rear lane or to move forward and turn to enter the rear lane.

3. The vehicle according to claim 1, wherein the controller is configured to generate the rear lane virtually based on the moving path of the object.

4. The vehicle according to claim 2, wherein when the controller determines that the vehicle is required to move forward and turn to enter the rear lane, the controller is configured to calculate a time at which the vehicle is able to enter the rear lane with a minimum turning radius.

5. The vehicle according to claim 4, wherein the controller is configured to estimate a fourth time taken for the vehicle to move forward from a current location and turn to completely enter the rear lane, a fifth time taken for a front end of the object to reach a rear end of the vehicle when the vehicle has completely entered the rear lane, and a sixth time taken for a rear end of the object to reach a front end of the vehicle when the vehicle has completely entered the rear lane, and when the controller determines that the fourth time is greater than the fifth time and less than the sixth time, the controller is configured to detect a probability of rear collision.

6. The vehicle according to claim 5, wherein the controller is configured to estimate a seventh time and a moving distance taken for a speed of the vehicle to reach a speed of the object after the vehicle completely enters the rear lane, and estimate an eighth time taken for the front end of the object to reach the rear end of the vehicle when the speed of the vehicle reaches the speed of the object, and when the controller determines that the seventh time is greater than the eighth time, the controller is configured to detect a probability of rear collision.

7. The vehicle according to claim 6, wherein the controller is configured to estimate a ninth time taken for the vehicle to reach a location at which the front end of the vehicle reaches the rear lane, a tenth time taken for the front end of the object to reach the location at which the front end of the vehicle reaches the rear lane, and an eleventh time taken for the rear end of the object to reach the location at which the front end of the vehicle reaches the rear lane, and when the controller determines that the ninth time is greater than the tenth time and less than the eleventh time, the controller is configured to detect a probability of rear side collision.

8. The vehicle according to claim 1, further comprising:
   a driving apparatus configured to operate the vehicle to brake to enter the rear lane.

9. The vehicle according to claim 1, further comprising:
   a communication device configured to transmit and receive data to and from the object,
   wherein when the object is detected as another vehicle, the controller is configured to determine whether the vehicle is able to enter the rear lane, based on data of the other vehicle received via the communication device, and determine a probability of collision.

10. A method of controlling a vehicle, comprising:
    acquiring, by a controller of the vehicle, speed information and driving direction information;
    sensing, by a controller of the vehicle, an object traveling on a rear lane and approaching the vehicle to acquire object data;
    estimating, by a controller of the vehicle, a moving path of the object based on the object data;
    determining, by a controller of the vehicle, whether the object is able to enter the rear lane, based on the speed information, the driving direction information, and the object data; and
    determining, by the controller of the vehicle, a probability of collision with the object traveling on the rear lane and approaching the vehicle, and
    controlling, by the controller of the vehicle, the vehicle to brake to enter the rear lane,
    wherein the determining of the probability of collision includes:
       when the vehicle is required to be operated in reverse to enter the rear lane, estimating, by the controller, a first time taken for a rear end of the vehicle to reach the rear lane, a second time taken for a front end of the object to reach a location at which the rear end of the vehicle reaches the rear lane, and a third time taken for the rear end of the object to reach the location at which the rear end of the vehicle reaches the rear lane; and
       detecting, by the controller, a probability of collision, when the first time is greater than the second time and less than the third time.

11. The method according to claim 10, wherein the determining of whether the vehicle is able to enter the rear lane includes:

determining, by the controller of the vehicle, whether the vehicle is required to operate in reverse to enter the rear lane or to move forward and turn to enter the rear lane.

12. The method according to claim 10, wherein the estimating of the moving path of the object includes:

generating, by the controller of the vehicle, the rear lane virtually based on the moving path of the object.

13. The method according to claim 10, further comprising:

in response to determining that the vehicle is required to move forward and turn to enter the rear lane, calculating, by the controller of the vehicle, a time at which the vehicle is able to enter the rear lane with a minimum turning radius.

14. The method according to claim 13, wherein the determining of the probability of collision includes:

estimating, by the controller of the vehicle, a fourth time taken for the vehicle to move forward from a current location and turn to completely enter the rear lane, a fifth time taken for a front end of the object to reach a rear end of the vehicle when the vehicle has completely entered the rear lane, and a sixth time taken for a rear end of the object to reach a front end of the vehicle when the vehicle has completely entered the rear lane; and detecting, by the controller of the vehicle, a probability of rear collision, when the fourth time is greater than the fifth time and less than the sixth time.

15. The method according to claim 14, wherein the determining of the probability of collision includes:

estimating, by the controller of the vehicle, a seventh time and a moving distance taken for a speed of the vehicle to reach a speed of the object after the vehicle completely enters the rear lane, and estimating an eighth time taken for the front end of the object to reach the rear end of the vehicle when the speed of the vehicle reaches the speed of the object; and detecting, by the controller of the vehicle, a probability of rear collision, in response to determining that the seventh time is greater than the eighth time.

16. The method according to claim 15, wherein the determining of the probability of collision includes:

estimating, by the controller of the vehicle, a ninth time taken for the vehicle to reach a location at which the front end of the vehicle reaches the rear lane, a tenth time taken for the front end of the object to reach the location at which the front end of the vehicle reaches the rear lane, and an eleventh time taken for the rear end of the object to reach the location at which the front end of the vehicle reaches the rear lane; and detecting, by the controller of the vehicle, a probability of rear side collision, in response to determining that the ninth time is greater than the tenth time and less than the eleventh time.

\* \* \* \* \*